(No Model.)

M. JOSEPHSON.
VEGETABLE CUTTER.

No. 525,499. Patented Sept. 4, 1894.

Witnesses
Albert B. Blackwood
Jos. H. Blackwood

Inventor
Moses Josephson
by A. G. Kuylman
Attorney

UNITED STATES PATENT OFFICE.

MOSES JOSEPHSON, OF SPRINGFIELD, ILLINOIS.

VEGETABLE-CUTTER.

SPECIFICATION forming part of Letters Patent No. 525,499, dated September 4, 1894.

Application filed December 11, 1893. Serial No. 493,371. (No model.)

*To all whom it may concern:*

Be it known that I, MOSES JOSEPHSON, a citizen of the United States of America, residing in Springfield, in the county of Sangamon and State of Illinois, have invented a new and useful Vegetable-Cutter, of which the following is a specification.

My invention has relation to improvements in vegetable cutters, of the style or class adapted to cut into slices potatoes and similar vegetables.

My invention consists in the novel construction of parts and their combinations as hereinafter fully specified, and particularly pointed out and distinctly claimed.

I have fully and clearly illustrated my invention in the accompanying drawings, wherein—

Figure 1:
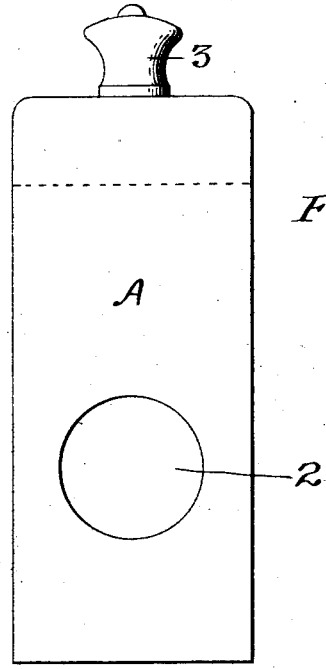
Figure 2:
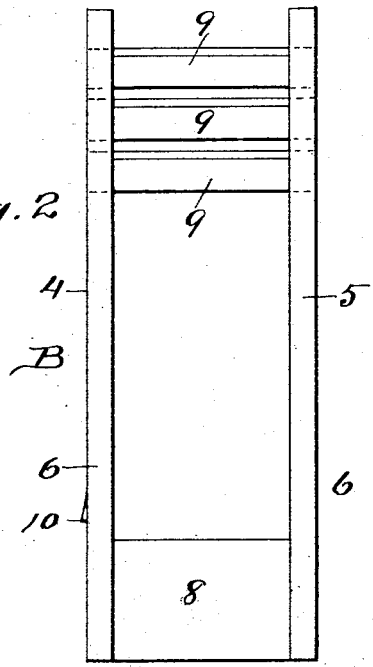
Figure 3:
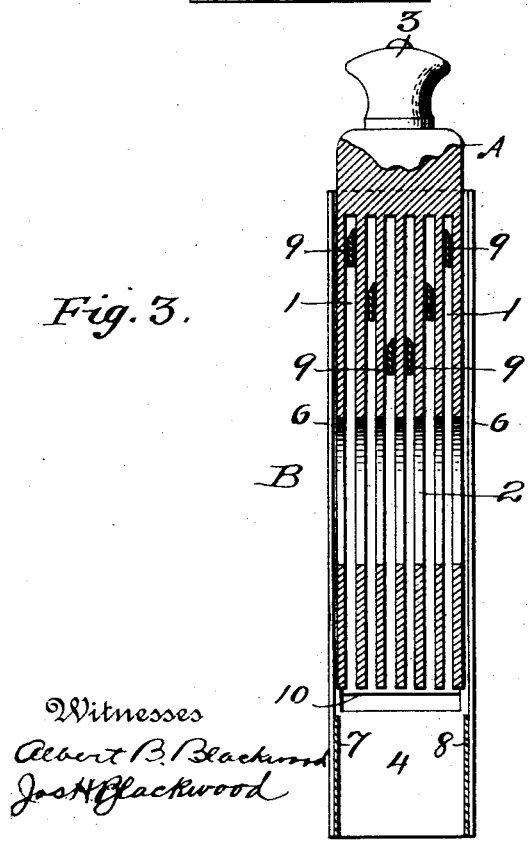
Figure 4:
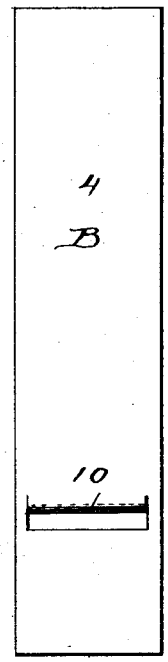

Figure 1, is a front view of the plunger. Fig. 2, is a front view of the knife-case. Fig. 3, is a vertical section of the plunger and knife-case arranged together. Fig. 4, is a side view of the knife-case showing the single slicing-blade or cutting flange.

A, designates the reciprocating plunger, of rectangular shape and having a requisite number of knife-slits 1, cut in, to pass over the knives, the slits being open at the lower end of the plunger. Through the body of the plunger is an aperture 2, large enough to take and hold the vegetable, such as a potato. A suitable hand-grasp 3, is fixed to, or in, the head of the plunger, substantially as shown.

B, designates the knife-case, consisting of two metal side-pieces 4, 5, having turned edge-flanges 6, to guide the plunger, and at the bottom connected by two substantial cross-plates 7, 8, substantially as shown. At the upper portion of the knife-case are fixed the knives 9, arranged at different vertical planes, and parallel with each other, the set appearing in a V-shaped disposition, as shown in the drawings, so that the pressure required to cut the vegetable is substantially on but two knives at one time. The ends of the knives are secured in the side-plates by any proper fastening or they may be soldered or brazed in the plates.

To operate the implement, the potato is placed in the aperture of the plunger, and the plunger then forced down into the casing carrying the potato down with it through the knives, and slicing it by the movement. The plunger stops short of the bottom of the knife-case that the end may not contact with the drippings, or in any substance in which the implement stands.

In one of the side-plates of the knife-case is formed a single slicing-blade or cutting-flange 10, which is used when it is desired to cut but a single slice at a time. By laying the knife-case on its side and reciprocating the vegetable over the flange 10, a slice is cut off at every reciprocation.

What I claim is—

The vegetable slicer consisting of the rectangular knife-casing B, having a number of knives in its upper portion, said knives being arranged parallel with each other on different planes, and the reciprocable plunger A, fitted to slide in the casing and having a series of slots to pass over the knives and a transverse opening through the plunger to take in a vegetable, as specified.

In witness whereof I have hereto set my hand in the presence of two attesting witnesses.

MOSES JOSEPHSON.

Attest:
CHAS. P. LAWRENCE,
JOHN J. AMOS.